June 23, 1964     A. O. JANSSON     3,138,225
MOLDING FASTENER
Filed Feb. 2, 1961     2 Sheets-Sheet 1
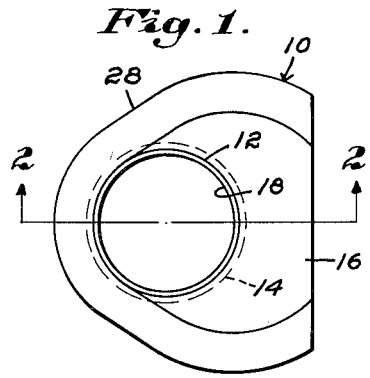
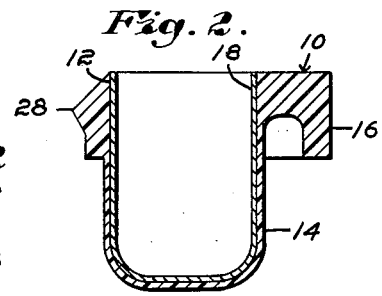
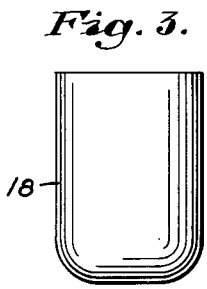
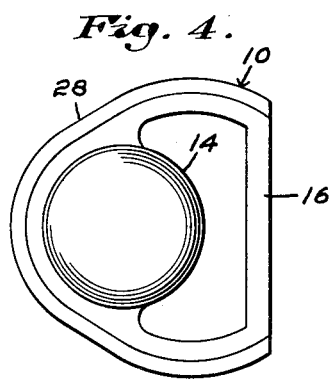
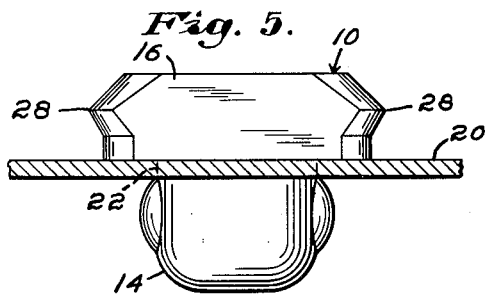
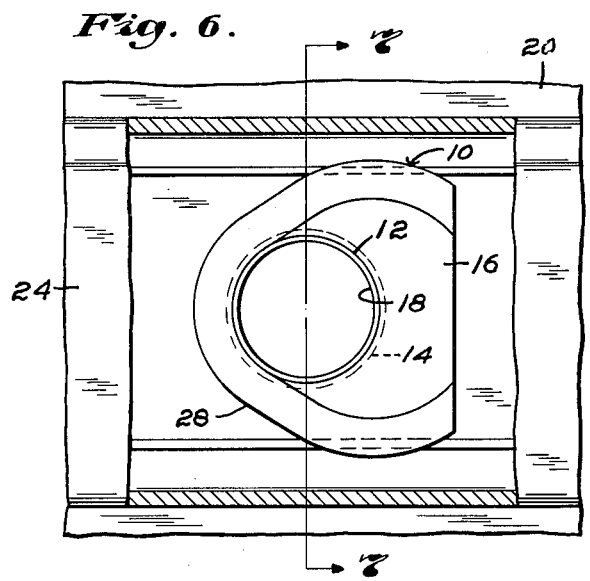
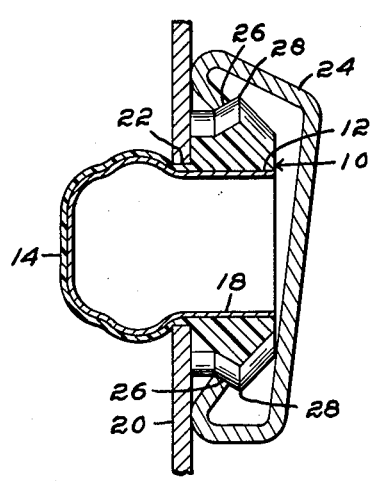
Inventor.
Arnold O. Jansson,
by Walter P. Jones
Atty.

June 23, 1964  A. O. JANSSON  3,138,225
MOLDING FASTENER
Filed Feb. 2, 1961  2 Sheets-Sheet 2
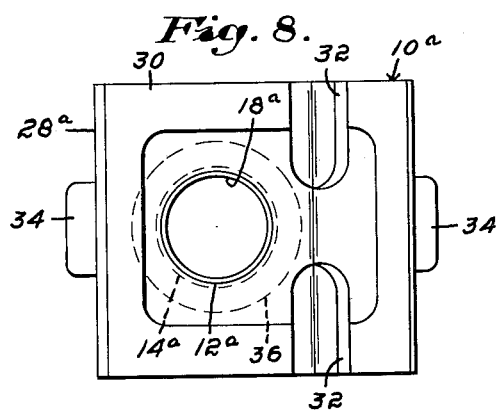
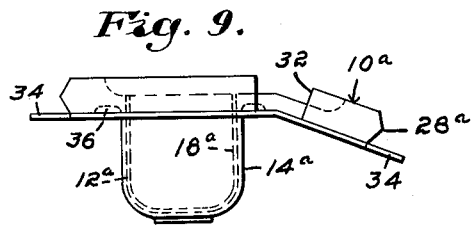
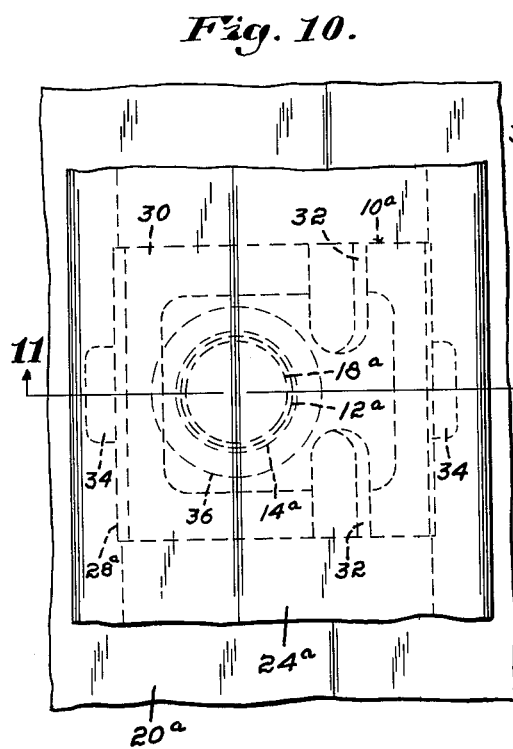
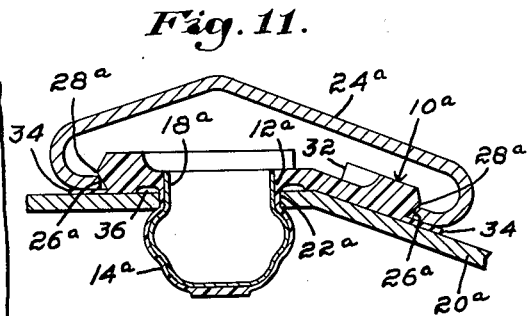
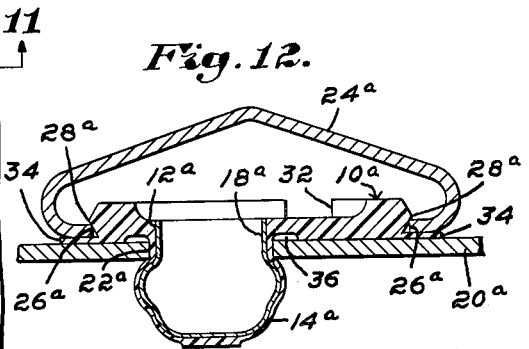
Inventor:
Arnold O. Jansson,
by Walter P. Jones
Atty.

United States Patent Office 3,138,225
Patented June 23, 1964

3,138,225
MOLDING FASTENER
Arnold O. Jansson, Arlington, Mass., assignor to United-Carr Incorporated, a corporation of Delaware
Filed Feb. 2, 1961, Ser. No. 86,802
2 Claims. (Cl. 189—35)

This invention relates to moldings of the type employed for decorative or finishing purposes and which, in the broader sense, is applicable to moldings generally. It is particularly adaptable for use with the moldings employed in connection with automobile bodies.

A primary object of the invention is to provide a fastener installation for moldings or the like which may be assembled from one side of a support structure.

A further object of the invention is to provide a fastener installation for moldings or the like which utilizes a fastener having a metal insert within a plastic container.

A still further object of the invention is to provide a fastener installation for moldings or the like having a fastener which utilizes a deformable metal insert for holding a resilient plastic stud in a set position after deformation.

Other objects of the invention will, in part, be obvious, and will, in part, appear hereinafter.

In the drawings:

FIG. 1 is a top plan view of the fastener;
FIG. 2 is a section taken on the line 2—2 of FIG. 1;
FIG. 3 is a side elevation of the insert;
FIG. 4 is a bottom plan view of the fastener shown in FIG. 3;
FIG. 5 is a side elevation of the fastener engaged to an apertured support, the support shown in section;
FIG. 6 is a top plan view of the support shown broken off, assembled with the fastener and a molding, a portion of which is broken away;
FIG. 7 is a section taken on the line 7—7 of FIG. 6 with the broken away portion of the molding restored;
FIG. 8 is a top plan view of a variation of the fastener;
FIG. 9 is a side elevation of the fastener shown in FIG. 8;
FIG. 10 is a top plan view of the fastener assembly with the fastener dotted in;
FIG. 11 is a section taken on line 11—11 of FIG. 10; and
FIG. 12 is a cross section of the fastener assembly showing engagement with a flat support.

Referring to the drawings, and referring particularly to FIGS. 1 through 7, there is illustrated a fastener having a base portion 10, said base portion having the general form of a segment of an oval and having an inner wall 12 forming an aperture through said base portion, the said inner wall 12 is continued throughout its circumference in a direction away from said base 10 to form a tubular stud portion 14, closed at the end farthest from said base portion 10. A flange 16 may be formed on the periphery of a portion of said base portion 10 normal to and extending away from said base portion 10 and partially circumscribing said stud portion 14 as shown in FIGS. 2 and 4. A tubular metal insert 18 closed at one end is placed in circumscribed abutting relationship with said stud portion 14 as shown in FIG. 2.

A support 20 having an engaging wall 22 forming an aperture therethrough may be engaged to the fastener in the following manner. The tubular stud portion 14 is passed between the said engaging wall 22 until the flange 16 rests on the portion of said support 20 approximately adjacent said engaging wall 22 as shown in FIG. 7. The length of said stud portion 14 will preferably be greater than the thickness of said support 20 although it is not absolutely necessary. A tool such as disclosed at FIG. 5 of the patent to W. R. Wiley, U.S. Patent No. 2,227,290 is passed into said insert 18 and a portion of the said insert 18 is distorted away from its axis at two or more points directly below said support 20 adjacent said engaging wall 22. This action will also distort the stud portion 14 into an abutting relationship with the edge of said engaging wall 22 farthest from said base portion 10. The applicant has disclosed, that the axis or center of the stud portion 14 lies on a different point from the center of the base portion 10, which feature allows a molding 24 attached to two or more fasteners to be moveably adjusted on a plane at right angles to the axis of said stud portion 14.

To engage a molding 24, such as used in the automotive trade, to the applicant's fastener, the contact edges 26 of said molding 24 are engaged beneath a ridge 28 extending from said base portion 10 in substantially spaced parallel relationship with said support 20 as shown in FIGS. 5 and 7.

The use of applicant's fastener will alleviate the chipping and subsequent loosening caused by the use of a metal fastener contacting the engaging wall 22 of the support 20. The applicant by sheathing the metal insert 18 with plastic does away with dissimilar metal corrosion which is a problem in this type of fastening and the relationship of the axis of said stud portion 14 to the center of said base portion 10 allows adjustment of the molding assembly as set forth hereinbefore.

Another requirement often desired in this type of fastening is the prevention of water leakage between the stud portion 14 of the fastener and the engaging edge 22 of the support. The variation disclosed at FIGS. 8 through 12 indicates a fastener which will prevent this water leakage. The fastener comprises a base portion 10a having an inner wall 12a merging into a tubular stud portion 14a extending away from the plane of said base portion 10a. The base portion 10a has the configuration of a rectangle and having a narrow rectangular rib 30 formed on the periphery of said base portion 10a extending away from the plane of said base portion 10a in the opposite direction of the stud portion 14a and the said rib 30 has a pair of arcuate walls 32 formed in opposed spaced relation through said rib 30 as shown at FIG. 8. A pair of tabs 34 are formed extending from the two opposed engaging sides of said base portion 10a, the said tabs 34 having a thickness less than the thickness of the base portion 10a and the rib 30. A channel 36 is formed on the underside of said base portion 10a circumscribing in abutting relationship a section of said stud portion 14a. A part of the base portion 10a is formed in oblique angle relationship to the remaining part at a line drawn approximately at that part of the acute walls 32 nearest the axis of said stud portion 14a. A metal insert 18a is engaged with the stud portion 14a in a manner similar to that of the engagement of the stud portion 14 with the insert 18 as set out hereinbefore. The engagement of the fastener with a support 20a is the same as that of the engagement of the original fastener with a support 20, however, because of the angularity of the base portion 10a and its ability to flex the variation may be engaged with the supports which are slightly bent or if the variation is used with a flat support it will allow a very snug engagement between the upper surface of the support and the base portion 10a. To prevent water leakage, a filler (not shown) of types well known in the art, may be used in the channel 36 to make a water impermeable engagement between the base portion 10a and the engaging wall 22a. A molding 24a can be engaged with the base portion 10a against a ridge 28a formed in a manner similar to the ridge 28. In this case, however, the portion of the molding 24a adjacent to its contact edge 26a will rest on the tabs 34, thereby alleviating any metal to metal contact between the molding and the support.

Since certain other obvious modifications may be made in this device without departing from the scope of the invention, it is intended that all matter contained herein be interpreted in an illustrative and not in a limiting sense.

I claim:

1. A fastener assembly comprising, in combination, a support having an engaging wall surrounding a stud receiving aperture, a hollow molding part associated with said support and a fastener holding said part in assembly with said support, said fastener having a flexible molded plastic part provided with a base portion having molding engaging portions engaged with said molding part to hold it in place, a tubular stud integral with and extending from said base portion and a portion of said stud extending through said aperture and the axis of said base offset from the axis of said stud, and a tubular deformable metal insert assembled within said tubular stud, said insert and said tubular stud permanently distorted laterally adjacent the underside of said support.

2. The combination of a fastener assembly, a support and a hollow molding part as set forth in claim 1 wherein a pair of tabs extend from said base portion and lie between said support and said molding part.

References Cited in the file of this patent

UNITED STATES PATENTS

| | | |
|---|---|---|
| 2,214,150 | Van Uum | Sept. 10, 1940 |
| 2,227,290 | Wiley | Dec. 31, 1940 |
| 2,271,495 | Hall | Jan. 27, 1942 |
| 2,347,863 | Woodward | May 2, 1944 |
| 2,681,716 | Black | June 22, 1954 |
| 2,712,120 | Cochran | June 28, 1955 |
| 2,862,267 | Parkin | Dec. 2, 1958 |
| 2,924,864 | Holton | Feb. 16, 1960 |
| 2,984,877 | Perrochat | May 23, 1961 |
| 3,018,529 | Perrochat | Jan. 30, 1962 |
| 3,029,486 | Raymond | Apr. 17, 1962 |
| 3,053,046 | Fleming | Sept. 11, 1962 |